April 30, 1963 C. S. MERTLER ET AL 3,088,016
THERMO-SENSING UNIT
Filed March 2, 1960 3 Sheets-Sheet 1

INVENTORS.
CHARLES S. MERTLER
BY RICHARD H. JORDAN

*Woodling and Krost,*
ATTORNEYS

INVENTORS.
CHARLES S. MERTLER
RICHARD H. JORDAN
BY Woodling and Krost,
ATTORNEYS April 30, 1963    C. S. MERTLER ET AL    3,088,016
THERMO-SENSING UNIT
Filed March 2, 1960    3 Sheets-Sheet 3

INVENTORS.
CHARLES S. MERTLER
BY RICHARD H. JORDAN

ATTORNEYS

United States Patent Office 3,088,016
Patented Apr. 30, 1963

3,088,016
THERMO-SENSING UNIT
Charles S. Mertler and Richard H. Jordan, Mansfield, Ohio, assignors to Stevens Manufacturing Company, Inc., a corporation of Ohio
Filed Mar. 2, 1960, Ser. No. 12,409
10 Claims. (Cl. 219—37)

The invention relates in general to temperature sensing units and more particularly to temperature sensing units for use with ranges, such as household electric ranges, to sense the temperature of a vessel heated on the range in order to control the heat imparted to the vessel.

The invention relates to a temperature sensing unit for a vessel heated on a surface unit electrically connected at least partially by rigid connections to a range, with the temperature sensing unit including a body engageable with the surface unit by mounting means, heat responsive cap means on the upper end of the body and spring means urging the cap means upwardly above the level of the surface unit to engage the underside of any vessel on the surface unit, two electrical connections to the heat responsive cap means and first and second electrical conductors fixedly disposed at least at one point relative to the rigid connections of the surface unit, the inner ends of the first and second conductors at least part of which are flexible to accommodate movements of the spring means are connected to the electrical connections of the cap means, and the first and second conductors providing external electrical connection to the heat responsive cap means.

Household ranges, such as electric ranges, have in recent years been provided with some form of control device which senses the temperature of the vessel being heated and uses this as a control for the heat input to the vessel. The normal configuration for range surface units, either gas or electric, is circular and, therefore, the open center of the surface heating units is a convenient place to locate the temperature sensing unit. Most household ranges have a drip pan underneath the surface unit to catch any foods spilled or boiled over, and since this drip pan needs occasional cleaning, the surface units have been made either partially or fully removable. The partially removable surface units have been ones wherein the electrical connections thereto are made by flexible but permanent electrical connections and the removable units have had some form of terminal block with a separable electrical connection to the surface unit. In either case the surface unit may be lifted out of the way to clean the drip pan.

Accordingly, with either type of range surface unit it is an object of the present invention to provide a temperature sensing unit which is fixedly fastened relative to the surface unit so that as the surface unit is moved out of the way for access to the drip pan, the temperature sensing unit is also moved directly with the surface unit for unobstructed access to the drip pan. This permits use of a drip pan without a center hole which prevents spillage.

Another object of the invention is to provide a small compact temperature sensing unit which is fixedly attached to a range surface unit.

Still another object of the invention is to provide a temperature sensing unit for a range surface unit which sensing unit has flexible connections to permit spring means to urge a part of the temperature sensing unit upwardly into engagement with a vessel heated by the surface unit.

Still another object of the invention is to provide a temperature sensing unit for a completely separable surface heating unit with the electrical connection to the temperature sensing unit being made at a terminal block which carries the separable electrical connections to the surface heating unit.

Still another object of the invention is to provide a temperature sensing unit which is rigidly connected to a surface heating unit to move therewith and with rigid electrical connections fixed relative to the surface unit, yet including flexible electrical connections to the temperature sensing means within the temperature sensing unit.

Still another object of the invention is to provide a temperature sensing unit with separable electrical connections utilizing standard parts and adaptable for use with currently available surface units.

Other objects and a fuller understanding of the invention may be had by referring to the following description and claims, taken in conjunction with the accompanying drawings, in which:

Figure 1:
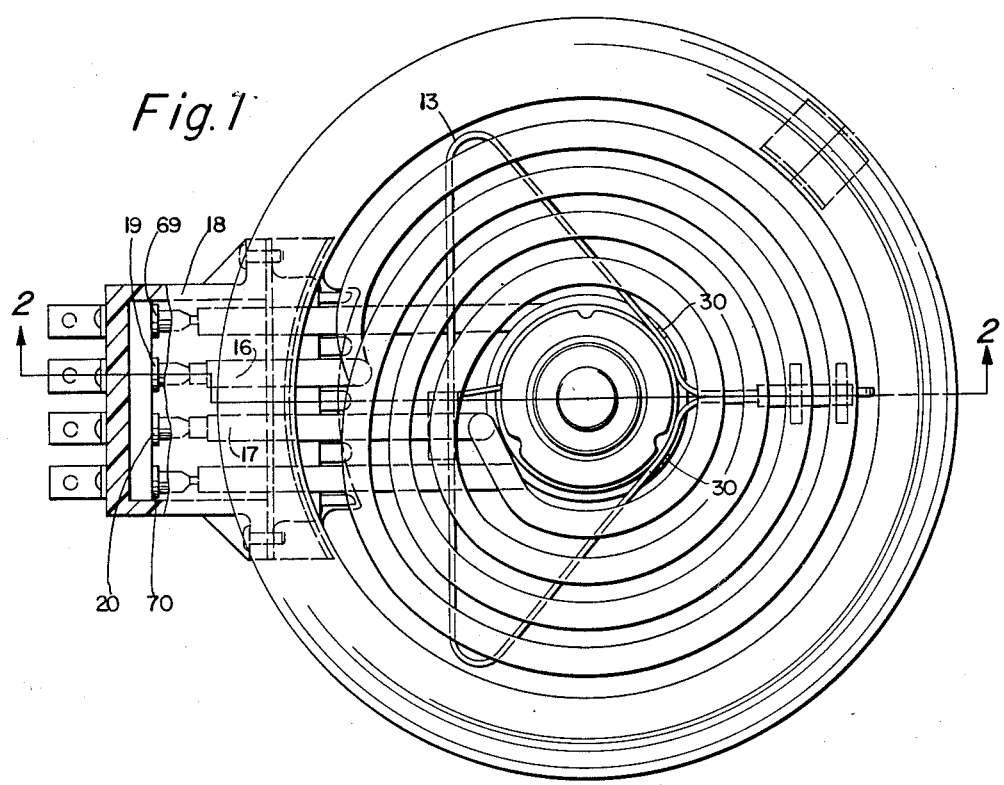
FIGURE 1 is a plan view of a surface unit incorporating therein a temperature sensing unit according to the invention.
Figure 2:
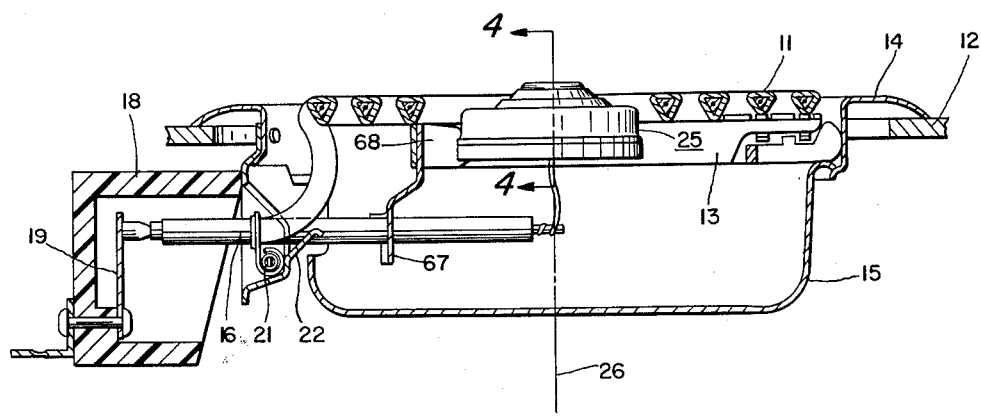
FIGURE 2 is a sectional view on line 2—2 of FIGURE 1.
Figure 3:
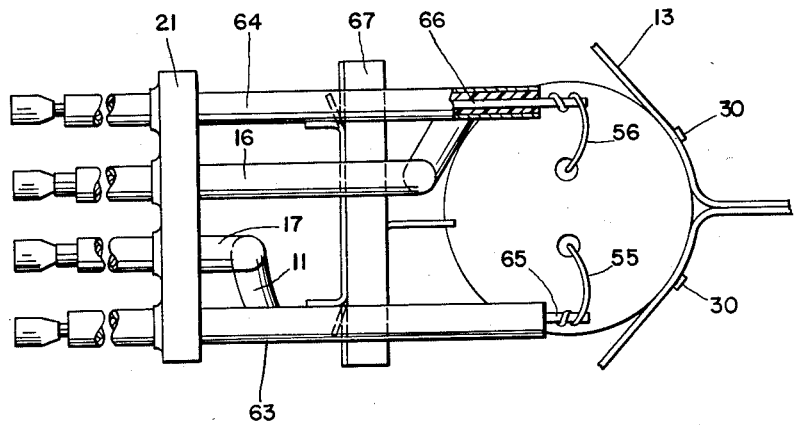
FIGURE 3 is a partial bottom view of the surface unit of FIGURE 1.

The figures of the drawing show generally a surface heating unit 11 of a range having a range top 12 and this surface heating unit 11 has been shown as an electrical heating unit which is a tubular sheathed heater. This tubular sheathed heater is wound generally in a spiral as seen in FIGURE 1 and carried on a support bracket 13 to more rigidly connect together the turns of the spiral. The support bracket 13, in turn, is carried on an outer rim 14 which rests on the range top 12. A drip pan 15 is carried on the outer rim 14 beneath the heating unit 11. This heating unit has first and second rigid tubular connections 16 and 17 at the two ends of the spiral and these tubular connections extend into a terminal block 18 which is fixedly attached to the range top 12. The terminal block 18 is a means to provide electrical connection to the heating unit either through partially flexible but permanent electrical connections or as shown in the figures, through a separable connection including contacts 19 and 20, which are carried in the terminal block 18. As shown in FIGURES 1 and 2 the internal heater within the sheathed tubular heating unit 11 makes abutting contact with the contacts 19 and 20 when the surface heating unit 11 is in its normal position on the range top 12. This is effected by a mounting bracket 21 connected to the tubular connectors 16 and 17 engaging a latch plate 22. This latch plate is fixed relative to the terminal block 18.

The temperature sensing unit 25 is adapted to be mounted generally on the central vertical axis 26 of the surface heating unit 11. This temperature sensing unit 25 includes a sheet metal body 27 which has an inverted cup shape. An insulator base 28 may be made, for example from a ceramic material to withstand the heat from this heating unit 11 and the body 27 has tabs 29 bent to engage the base 28 to fasten the two together. Also this body 27 has tabs 30 to engage apertures in the support bracket 13 to fixedly support the temperature sensing unit 25 relative to the heating unit 11.

A conical surface 34 is provided in the body 27 to define an upwardly directed aperture in this body. A sheet metal top 35 has a downwardly sloping conical skirt 36 engageable with the aperture defining surface 34. A conical compression spring 37 is disposed within the body 27 and acts between the base 28 and the metal top 35 to urge this top upwardly toward engagement with the aperture defining surface 34. The top has a coaxial opening 38 to receive the stem 39 of a metal cap 40. This cap is made of a metal of good heat conductivity, such as aluminum, and overlies the upper end of the metal top 36. The position of the entire temperature sensing unit 25 as determined by the tabs 30 is such that the cap 40 lies above the plane of the surface heating unit 11 as determined by the urging of the spring 37 so that this metal cap 40 will engage the underside of any vessel being heated on the surface unit.

The stem 39 is provided with a shoulder 43 which engages the metal top 35 to define an annular wire space 44 between the underside of this cap 40 and the upper surface of the metal top 35. An insulating washer 45, for example, one made of mica, is provided against the underside of the metal top 35. An insulating eyelet support washer 46 is also provided on the stem 39 and the stem is headed at 47 to fasten together the cap 40, the washers 45 and 46 and the metal top 35. First and second metal eyelets 48 and 49 are carried in the eyelet support washer 46 and act as electrical terminals.

Figure 6:
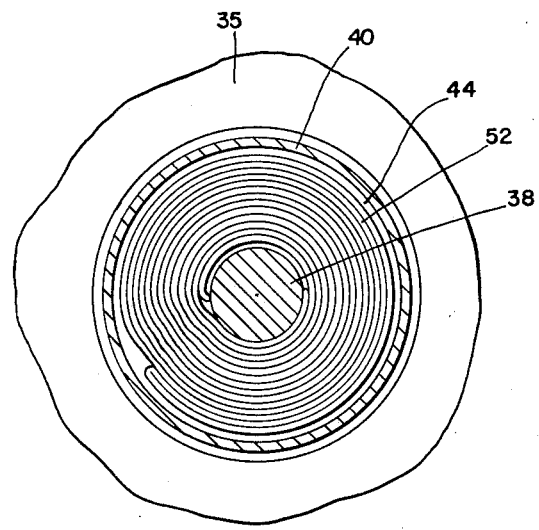
FIGURE 6 is a sectional view on line 6—6 of FIGURE 4.

A resistance wire 52 is wound as a doubled wire in a pancake coil in a single axial thickness in the annular wire space 44. This is as shown in FIGURE 6. This resistance wire 52 has first and second ends 53 and 54 which pass through apertures in the metal top 35 and insulating washer 45 to be disposed in the respective eyelets 48 and 49. First and second flexible wires 55 and 56 pass through apertures 57 and 58 in the base 28 and enter the respective eyelets 48 and 49. Terminal pins 59 and 60 are frictionally inserted into the eyelets 48 and 49 to mechanically hold the resistance wire ends 53 and 54 and the flexible lead wires 55 and 56 in the eyelets and also to provide electrical interconnection.

First and second metallic tubes 63 and 64 have first and second insulated conductors 65 and 66 therein, respectively, and these metallic tubes 63 and 64 are substantially rigid and are mounted substantially parallel to and outboard of the rigid tubular connections 16 and 17. This mounting is provided by the mounting bracket 21 and by a second mounting bracket 67. This mounting bracket 67 also has a finger 68 establishing the position of one side of the temperature sensing unit 25. The inner ends of the first and second conductors 65 and 66 terminate substantially on a vertical plane containing the central axis 26. The flexible lead wires 55 and 56 extend downwardly through the apertures 57 and 58 in the base 28 and are permanently connected to the first and second conductors 65 and 66, respectively. The first and second conductors 65 and 66 extend into the terminal block 18 for separable connection with contacts 69 and 70. It will therefore be seen that the terminal block 18 is a four-terminal block which is a standard item used with some surface units which have two separate surface units 11. Accordingly, this four-terminal block 18 provides a convenient means for establishing separable electrical connection not only to the surface heating unit 11, but also to the temperature sensing unit 25.

The temperature sensing unit 25 is fixedly mounted relative to the surface heating unit 11 so that as this unit 11 is removed from the range top 12, the temperature sensing unit 25 is also removed at the same time. The metallic tubes 63 and 64 are fixed relative to the rigid tubular connections 16 and 17 so that all electrical connections which enter the terminal block are rigidly held together.

Figure 4:
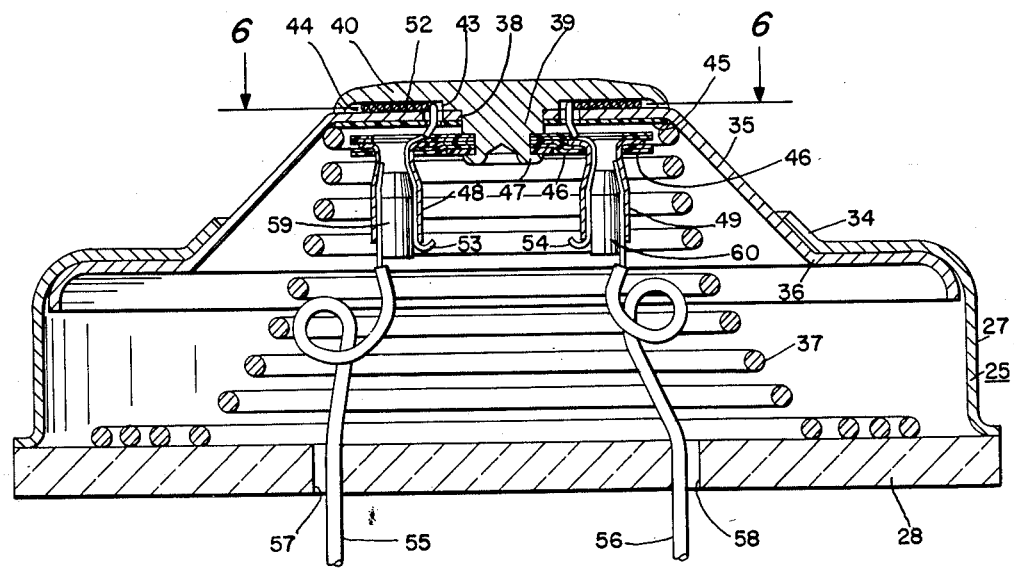
FIGURE 4 is an enlarged sectional elevational view of the temperature sensing unit taken on line 4—4 of FIGURE 2.
Figure 5:
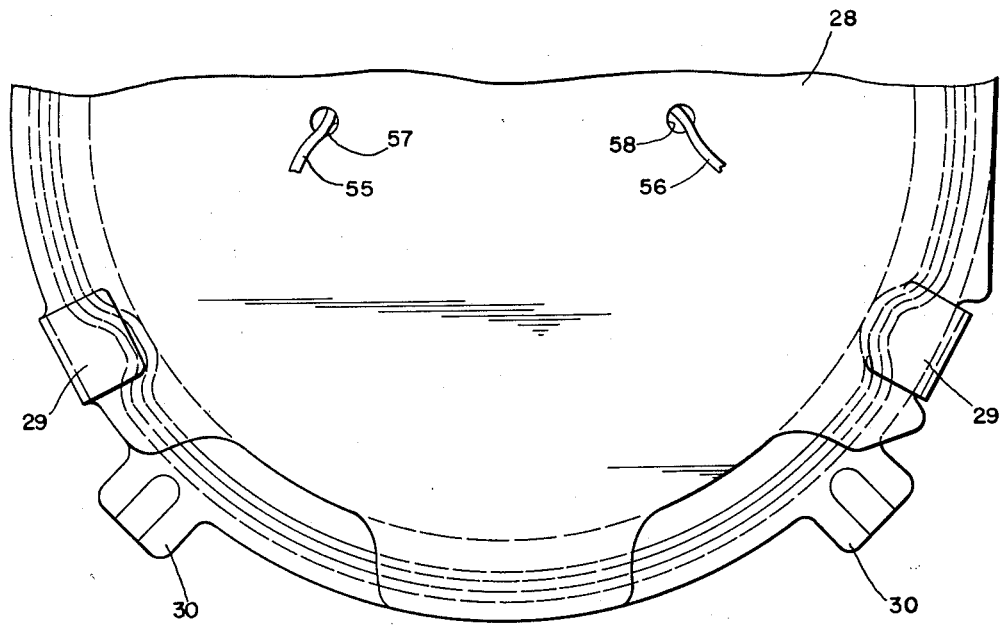
FIGURE 5 is an enlarged partial bottom view of the temperature sensing unit.

The compression spring 37 urges the metal cap upwardly and this cap 40 together with the resistance wire 52 may be considered to be temperature responsive cap means which is urged by the spring 37 into engagement with the underside of any vessel on the heating unit 11. As is best shown in FIGURE 2, the metal cap 40 is normally above the level of the heating unit 11 as urged by the spring 37, and since the metallic tubes 63 and 64 and the body 27 are fixed relative to the heating unit 11, the flexible lead wires 55 and 56 are the only flexible part of the entire electrical connection which is required in order to accommodate the small vertical movement of the metal cap 40 and the metal top 35. This small vertical movement flexes these lead wires 55 and 56 to a very small extent, and accordingly, the entire device is quite simple and reliable. The resistance wire 52 is subjected only to a low voltage, for example, 6 to 12 volts may be all that is required on this resistance wire 52, and accordingly, only low voltage insulation need be provided thereon. Glass insulated wire is quite suitable since the glass insulation is homogeneous and thin for good heat transfer yet providing sufficient electrical insulation. The flexible lead wires 55 and 56 may be stranded for a greater flexibility and may have a small loop therein, as shown in FIGURE 4, to increase the flexibility and eliminate the possibility of breakage upon continued flexing.

The resistance wire 52 is preferably wound as a doubled coil in a pancake coil in a single axial thickness, as best shown in FIGURE 6, in order to provide maximum heat transfer to the wire from the metal cap 40. Also the fact that this resistance wire 52 is wound as a doubled wire establishes that both ends 53 and 54 may be passed through apertures in the metal top 35 closely adjacent the stem 39 which assures that every bit of the resistance wire 52 is utilized. If this resistance wire 52 were wound as a single spiral, then it would have to start near the stem and end in an aperture at the outer periphery of this coil. Since the length of the resistance wire determines the resistance and since the resistance value is desired to be closely controlled, one could not be certain that this single spiral would fully utilize all of the resistance wire in the annular wire space 44. By wrapping this resistance wire as a double spiral one can make certain that a predetermined exact amount of resistance wire will be disposed in the annular wire space 44 so as to accurately sense the temperature of the vessel.

Although this invention has been described in its preferred form with a certain degree of particularity, it is understood that the disclosure of the preferred form has been made only by way of example and that numerous changes in the details of construction and the combination and arrangement of parts may be resorted to without departing from the spirit and the scope of the invention as hereinafter claimed.

What is claimed is:

1. A temperature sensing unit for a vessel heated on a surface unit separately connected by rigid connections to a range terminal block, said temperature sensing unit comprising, in combination, a body having a surface defining an upwardly directed aperture, mounting means on said body engageable with the surface unit to mount said body fixed relative to the surface unit, a top having a downwardly sloping skirt within said body and engageable with said aperture defining surface, heat responsive cap means on the upper end of said top, spring means within said body urging said cap means upwardly above the level of the surface unit to engage the underside of any vessel on the surface unit, a terminal support washer disposed in said body, two terminals insulatively carried in said support washer, two electrical connections on said heat responsive cap means connected to said two terminals, first and second conductors fixedly disposed parallel to and outboard of the rigid connections of the surface unit, the inner ends of said first and second conductors terminating generally centrally under said temperature sensing unit, flexible lead wires interconnecting said terminals and the inner ends of said first and second conductors, and said first and second conductors providing for external electrical connection at the range terminal block.

2. A temperature sensing unit for a vessel heated on a surface unit, said temperature sensing unit comprising, in combination, a body having a surface defining an upwardly directed aperture, mounting means on said body engageable with the surface unit to mount said body fixed relative to the surface unit, a top having a downwardly sloping skirt within said body and engageable with said aperture defining surface, a metal cap of good heat conductivity on the upper end of said top; spring means within said body urging said cap upwardly above the level of the surface unit to engage the underside of any vessel on the surface unit, the underside of said metal cap defining at least part of an annular wire space, a terminal support washer disposed in said body, two terminals insulatively carried in said support washer, a resistance wire having two ends and disposed in said annular wire space, the ends of said resistance wire being connected to said terminals, first and second conductors having inner ends terminating generally centrally under said temperature sensing unit, flexible lead wires interconnecting said terminals and the inner ends of said first and second conductors, and said first and second conductors providing for external electrical connection to said resistance wire.

3. A temperature sensing unit for a vessel heated on a surface unit separably connected by rigid connections to a range terminal block, said temperature sensing unit comprising, in combination, a body having a surface defining an upwardly directed aperture, mounting means on said body engageable with the surface unit to mount said body fixed relative to the surface unit, a top having a downwardly sloping skirt within said body and engageable with said aperture defining surface, a metal cap of good heat conductivity on the upper end of said top, spring means within said body urging said cap upwardly above the level of the surface unit to engage the underside of any vessel on the surface unit, the underside of said metal cap defining at least part of an annular wire space, a terminal support washer disposed in said body, two terminals insulatively carried in said support washer, a resistance wire having two ends and disposed in said annular wire space, the ends of said resistance wire being connected to said terminals, first and second metallic tubes with insulated first and second conductors therein, respectively, and fixedly disposed parallel to and outboard of the rigid connections of the surface unit, the inner ends of said first and second conductors terminating generally centrally under said temperature sensing unit, flexible lead wires interconnecting said terminals and the inner ends of said first and second conductors, and said first and second conductors providing for external electrical connection at the range terminal block.

4. A temperature sensing unit for a vessel heated on a surface unit separably connected by rigid connections to a range terminal block, said temperature sensing unit comprising, in combination, a body having a surface defining an upwardly directed aperture, a top having a downwardly sloping skirt within said body and engageable with said aperture defining surface, spring means within said body urging said top upwardly toward engagement with said aperture defining surface, a surface defining a coaxial opening in said top, a metal cap of good heat conductivity on the upper end of said top and having a stem disposed in said coaxial opening, mounting means on said body engageable with the surface unit to dispose said metal cap normally above the level of the surface unit under urging of said spring means to engage the underside of any vessel on the surface unit, said metal cap defining an annular wire space with said top, a resistance wire having two ends and disposed in said annular wire space, first and second metallic tubes with insulated first and second conductors therein, respectively, and disposed parallel to and outboard of the rigid connections of the surface unit, the inner ends of said first and second conductors terminating generally centrally under said temperature sensing unit, flexible lead wires interconnecting the ends of said resistance wire and the inner ends of said first and second conductors, and said first and second conductors providing for external electrical connection at the range terminal block.

5. A temperature sensing unit for a vessel heated on a surface unit separably connected by rigid connections to a range terminal block, said temperature sensing unit comprising, in combination, a body having a surface defining an upwardly directed aperture, mounting means on said body engageable with the surface unit to mount said body fixed relative to the surface unit, a top having a downwardly sloping skirt within said body and engageable with said aperture defining surface, a surface defining a coaxial opening in said top, a metal cap of good heat conductivity on the upper end of said top and having a stem disposed in said coaxial opening, spring means within said body urging said cap upwardly above the level of the surface unit to engage the underside of any vessel on the surface unit, the underside of said metal cap defining at least part of an annular wire space, an eyelet support washer disposed on said stem, two eyelets insulatively carried in said eyelet support washer, two flexible lead wires extending into said eyelets, a resistance wire having two ends and wrapped as a doubled wire in a single axial thickness in said annular wire space, the ends of said resistance wire extending into said eyelets, a terminal pin frictionally engaging each eyelet and providing electrical connection of said resistance wire ends with said lead wires, first and second metallic tubes with insulated first and second conductors therein, respectively, and disposed parallel to and outboard of the rigid connections of the surface unit, the inner ends of said first and second conductors terminating generally centrally under said temperature sensing unit and being connected to said flexible lead wires, and said first and second conductors providing for external electrical connection at the range terminal block.

6. A temperature sensing unit for a vessel heated on a surface unit separably connected by rigid connections to a range terminal block, said temperature sensing unit comprising, in combination, a body having a surface defining an upwardly directed aperture, a top having a downwardly sloping skirt within said body and engageable with said aperture defining surface, spring means within said body urging said top upwardly toward engagement with said aperture defining surface, a surface defining a coaxial opening in said top, a metal cap of good heat conductivity on the upper end of said top and having a stem disposed in said coaxial opening, mounting means on said body engageable with the surface unit to dispose said metal cap normally above the level of the surface unit under urging of said spring means to engage the underside of any vessel on the surface unit, said metal cap defining an annular wire space with said top, an eyelet support washer disposed on said stem, two eyelets insulatively carried in said eyelet support washer, two flexible lead wires extending into said eyelets, a resistance wire having two ends and wrapped as a doubled wire in a single axial thickness in said annular wire space, the ends of said resistance wire extending into said eyelets, a terminal pin frictionally engaging each eyelet and providing electrical connection of said resistance wire ends with said lead wires, first and second metallic tubes with insulated first and second conductors therein, respectively, and disposed parallel to and outboard of the rigid connections of the surface unit, the inner ends of said first and second conductors terminating generally centrally under said temperature sensing unit and being connected to said flexible lead wires, and said first and second conductors providing for external electrical connection at the range terminal block.

7. A temperature sensing unit for a vessel heated on a surface unit mounted on a support bracket and separably connected by rigid connections at a terminal block to a range top, said temperature sensing unit comprising, in combination, an inverted cup-shaped body, a base closing the underside of said body, a surface defining an upwardly directed aperture in said body, a metal top having a downwardly sloping skirt within said body and engageable with said aperture defining surface, spring means within said body urging said metal top upwardly toward engagement with said aperture defining surface, a surface defining a coaxial opening in said metal top, a metal cap of good heat conductivity on the upper end of said metal top and having a stem disposed in said coaxial opening, mounting means on said body engageable with the support bracket of the surface unit to dispose said metal cap normally above the level of the surface unit under urging of said spring means to engage the underside of any vessel on the surface unit, said metal cap being spaced above said top to define an annular wire space therewith, an eyelet support washer disposed on said stem, first and second eyelets insulatively carried in said eyelet support washer, apertures in said base, first and second flexible lead wires passing through said base aperture and extending into said first and second eyelets, respectively, a resistance wire having first and second ends and disposed in said annular wire space, the said first and second ends of said resistance wire extending into said first and second eyelets, first and second terminal pins frictionally engaging said first and second eyelets, respectively, and providing electrical connection of said first and second resistance wire ends with said first and second lead wires, respectively, first and second metallic tubes with insulated first and second conductors therein, respectively, and disposed parallel to and outboard of the rigid connections of the surface unit, said first and second conductors providing for external electrical connection at the terminal block, and the inner ends of said first and second conductors terminating generally centrally under said temperature sensing unit and being connected to said first and second flexible lead wires.

8. A temperature sensing unit for a vessel heated on a surface unit mounted on a support bracket and separably connected by tubular connections at a terminal block to a range top, said temperature sensing unit comprising, in combination, an inverted cup-shaped body, a base closing the underside of said body, a surface defining an upwardly directed aperture in said body, a metal top having a downwardly sloping skirt within said body and engageable with said aperture defining surface, spring means within said body urging said metal top upwardly toward engagement with said aperture defining surface, a surface defining a coaxial opening in said metal top, a metal cap of good heat conductivity on the upper end of said metal top and having a stem disposed in said coaxial opening, mounting means on said body engageable with the support bracket of the surface unit to dispose said metal cap normally above the level of the surface unit under urging of said spring means to engage the underside of any vessel on the surface unit, a shoulder on said stem engaging said metal top to define an annular wire space between said top and cap, an eyelet support washer disposed on said stem, first and second eyelets insulatively carried in said eyelet support washer, apertures in said base, first and second flexible lead wires passing through said base apertures and extending into said first and second eyelets, respectively, a resistance wire having first and second ends and wrapped as a doubled wire in a single axial thickness in said annular wire space, the said first and second ends of said resistance wire extending into said first and second eyelets, first and second terminal pins frictionally engaging said first and second eyelets, respectively, and providing electrical connection of said first and second resistance wire ends with said first and second lead wires, respectively, first and second metallic tubes with insulated first and second conductors therein, respectively, and disposed parallel to and outboard of the electrical tubular connections of the surface unit, said first and second conductors providing for external electrical connection at the terminal block, and the inner ends of said first and second conductors terminating generally centrally under said temperature sensing unit and being connected to said first and second flexible lead wires.

9. A temperature sensing unit for a vessel heated on a surface unit mounted on a support bracket and separably connected by tubular connections at a terminal block to a range top, said temperature sensing unit comprising, in combination, a metal inverted cup-shaped body, a base closing the underside of said body, a surface defining an upwardly directed aperture in said metal body, a metal top having a downwardly sloping conical skirt within said body and engageable with said aperture defining surface, a compression spring within said body and engaging said metal top to urge same upwardly toward engagement with said aperture defining surface, a surface defining a coaxial opening in said metal top, a metal cap of good heat conductivity on the upper end of said metal top and having a stem disposed in said coaxial opening, metal tabs as part of said metal body engageable with the support bracket of the surface unit to dispose said metal cap normally above the level of the surface unit under urging of said compression spring to engage the underside of any vessel on the surface unit, a shoulder on said stem engaging said metal top to define an annular wire space between said top and cap, two wire apertures in said metal top, a resistance wire having the two ends thereof passed through said two wire apertures and wrapped as a doubled wire in a single axial thickness in said annular wire space, an insulator washer disposed on said stem against the underside of said metal top and having apertures through which said wire ends are passed, an eyelet support washer disposed on said stem against the underside of said insulator washer, first and second eyelets insulatively carried in said eyelet support washer, apertures in said base, first and second flexible lead wires mutually insulatively passing through said base apertures and extending into said first and second eyelets, respectively, said first and second resistance wire ends extending into said first and second eyelets, respectively, first and second terminal pins frictionally engaging said first and second eyelets, respectively, and providing electrical connection of said first and second resistance wire ends with said first and second lead wires, respectively, first and second metallic tubes with insulated first and second conductors therein, respectively, and fixedly disposed parallel to and outboard of the electrical tubular connections of the surface unit, said first and second conductors providing for external electrical connection at the terminal block, and the inner ends of said first and second conductors terminating generally centrally under said temperature sensing unit and being connected to said first and second flexible lead wires.

10. A temperature sensing unit for a vessel heated on a surface unit mounted on a support bracket and separably connected by tubular connections at a terminal block to a range top, said temperature sensing unit comprising, in combination, a metal inverted cup-shaped body, an insulator base closing the underside of said body, a conical surface defining an upwardly directed aperture in said metal body, a metal top having a downwardly sloping conical skirt within said body and engageable with said aperture defining conical surface, a conical compression spring within said body and engaging said metal top to urge same upwardly toward engagement with said aperture defining surface, a surface defining a coaxial opening in said metal top, an aluminum cap on the upper end of said metal top and having a stem disposed in said coaxial opening, metal tabs as part of said metal body engageable with the support bracket of the surface unit to dispose said aluminum cap normally above the level of the surface unit under urging of said compression spring to engage the underside of any vessel on the surface unit, a shoulder on said stem engaging said metal top to define an annular wire space between said top and cap, two wire apertures in said metal top, a resistance wire having the two ends thereof passed through said two wire apertures and wrapped as a doubled wire in a pancake coil in a single axial thickness in said annular wire space, a mica washer disposed on said stem against the underside of said metal top and having apertures through which said wire ends are passed, an insulating eyelet support washer disposed on said stem against the underside of said mica washer, first and second eyelets in said eyelet support washer, apertures in said insulator base, first and second flexible lead wires passing through said base apertures and extending into said first and second eyelets, respectively, said first and second resistance wire ends extending into said first and second eyelets, respectively, first and second terminal pins frictionally engaging said first and second eyelets, respectively, and providing electrical connection of said first and second resistance wire ends with said first and second lead wires, respectively, first and second metallic tubes with insulated first and second conductors therein, respectively, and fixedly disposed parallel to and outboard of the electrical tubular connections of the surface unit, said first and second conductors providing for external electrical connection at the terminal block, and the inner ends of said first and second conductors terminating generally centrally under said temperature sensing unit and being connected to said first and second flexible lead wires.

References Cited in the file of this patent
UNITED STATES PATENTS

| | | |
|---|---|---|
| 2,463,984 | Lederer | Mar. 8, 1949 |
| 2,806,122 | Thunander | Sept. 10, 1957 |
| 2,822,455 | Molyneaux et al. | Feb. 4, 1958 |
| 2,980,875 | Sivacek | Apr. 18, 1961 |